(12) United States Patent  (10) Patent No.: US 7,836,911 B2
Arnott  (45) Date of Patent: Nov. 23, 2010

(54) GAS PRESSURE REGULATOR WITH A VALVE AND PISTON ASSEMBLY

(75) Inventor: Glen M. Arnott, 1982 Palace Dr., New Braunfels, TX (US) 78130

(73) Assignees: Glen M. Arnott; Daniel A. Holt

( * ) Notice: Subject to any disclaimer, the term of this patent is extended or adjusted under 35 U.S.C. 154(b) by 612 days.

(21) Appl. No.: 11/804,455

(22) Filed: May 18, 2007

(65) Prior Publication Data

US 2008/0283130 A1  Nov. 20, 2008

(51) Int. Cl.
*G05D 16/00* (2006.01)
(52) U.S. Cl. ............... 137/116.5; 137/505.25; 137/508
(58) Field of Classification Search ............... 137/116.5, 137/505.25, 505.28, 505.18, 508
See application file for complete search history.

(56) References Cited

U.S. PATENT DOCUMENTS

| | | | | |
|---|---|---|---|---|
| 3,472,264 A | * | 10/1969 | Petry | ............... 137/116.5 |
| 4,094,314 A | | 6/1978 | Le Cornec | |
| 4,620,562 A | | 11/1986 | Pacht | |
| 4,664,451 A | * | 5/1987 | Sakaguchi et al. | ......... 303/9.75 |
| 4,813,450 A | * | 3/1989 | Ishiwata et al. | ............ 303/9.62 |
| 4,887,573 A | | 12/1989 | Fujiwara et al. | |
| 4,887,638 A | | 12/1989 | Hellquist et al. | |
| 5,066,072 A | * | 11/1991 | Yanagi et al. | ............... 303/9.75 |
| 5,209,255 A | * | 5/1993 | Dehio | ................... 137/115.14 |
| 5,238,021 A | | 8/1993 | Powell et al. | |
| 5,284,299 A | | 2/1994 | Medlock | |
| 5,507,308 A | | 4/1996 | Chambonnet | |
| 5,595,209 A | | 1/1997 | Atkinson et al. | |
| 6,412,516 B1 | * | 7/2002 | Goldsmith | ................... 251/282 |
| 6,523,565 B2 | | 2/2003 | Girouard | |
| 6,554,022 B2 | | 4/2003 | Wakeman | |
| 6,637,451 B2 | * | 10/2003 | Neff et al. | ................. 137/116.5 |
| 6,874,521 B1 | | 4/2005 | Amidzich | |
| 6,938,841 B2 | | 9/2005 | Holtzman | |
| 6,986,338 B2 | * | 1/2006 | Gotthelf | ................ 137/505.18 |
| 7,073,392 B2 | | 7/2006 | Lull et al. | |
| 7,134,447 B2 | | 11/2006 | Boyer | |
| 7,140,387 B2 | | 11/2006 | Wilson, Jr. et al. | |

\* cited by examiner

*Primary Examiner*—Stephen Hepperle
(74) *Attorney, Agent, or Firm*—Jackson Walker, LLP

(57) ABSTRACT

A pressure regulator which includes a body. The body has inner walls defining an inlet port. Slidably moving within the inlet port is a hollow stem of a valve and piston assembly. The hollow stem is in slidable gas sealing contact with the inlet port. The valve and piston assembly includes a piston having a piston head with a valved opening therethrough. In the opening in the piston head is the arm of a plug. A body of the plug lies within the sliding piston held in place by a keeper spring, the keeper spring for maintaining a removed end of the plug arm against inner walls of the body. With such a structure, movement of the piston and valve assembly will be capable of unseating the plug from the valved opening in the piston allowing gas to flow from the hollow stem at the inlet port through an inner volume of the piston, through the valved opening of the piston head and into a regulated gas chamber defined in part by the inner walls of the body and an outer surface of the piston head.

31 Claims, 8 Drawing Sheets

GAS PRESSURE REGULATOR WITH A VALVE AND PISTON ASSEMBLY

FIELD OF THE INVENTION

Gas pressure regulators, namely, a piston-type gas pressure regulator with a valve in piston assembly for maintaining a set outlet pressure when the high pressure source drops.

BACKGROUND OF THE INVENTION

Gas pressure regulators have a number of uses. One such use of a gas pressure regulator includes providing a fixed output pressure from a variable high pressure inlet source. For example, a high pressure tank of breathing gas at 3000 psi may provide an output gas at 20 psi to a downstream device. However, one of the shortcomings of the prior art gas pressure regulators is that, as the high pressure source is depleted, the low pressure, even when set at a fixed value, may rise above that value before the regulated valve shuts off the source. For example, as a high, variable pressure source gas initially at 3000 psi drops, through use, say to 800 psi, the initial set pressure for closure at the transition or regulated valve can rise from its initial set pressure of, for example, 20 psi, to a higher pressure of, for example, 38 psi.

While in some applications this may not be a problem, other applications are sensitive to over pressurization from an initial set pressure. Therefore, there is a need for a gas pressure regulator in which the set pressure at the outlet port or in a regulated gas chamber does not change materially with the drop in pressure of the high pressure gas.

OBJECTS OF THE INVENTION

It is one of several objects of the present invention to provide for a pressure regulator which is capable of maintaining a set downstream regulated pressure when engaged to a high pressure source whose high pressure may diminish in value through use.

SUMMARY OF THE INVENTION

One embodiment of Applicant's device includes a gas pressure regulator which includes a body. The body has inner walls defining an inlet port. Slidably moving within the inlet port is a valve and piston assembly. The valve and piston assembly includes a hollow stem in slidable, gas sealing contact with the inlet port. The valve and piston assembly includes a piston having a piston head with a valved opening therethrough. Engaged with the opening in the piston head is a plug having an arm, the arm extending through the valved opening. A body of the plug lies within the sliding piston held in place by a keeper spring, the keeper spring for maintaining a removed end of the plug arm against the inner walls of the body.

With such a structure, movement of the piston and valve assembly will be capable of unseating the plug from the opening in the piston head allowing gas to flow from the hollow stem at the inlet port through an inner volume of the piston, through the valved opening of the piston head and into a regulated gas chamber defined in part by the inner walls of the body and an outer surface or crown of the piston head.

ELEMENT NUMERICAL DESIGNATIONS

Figure 1:
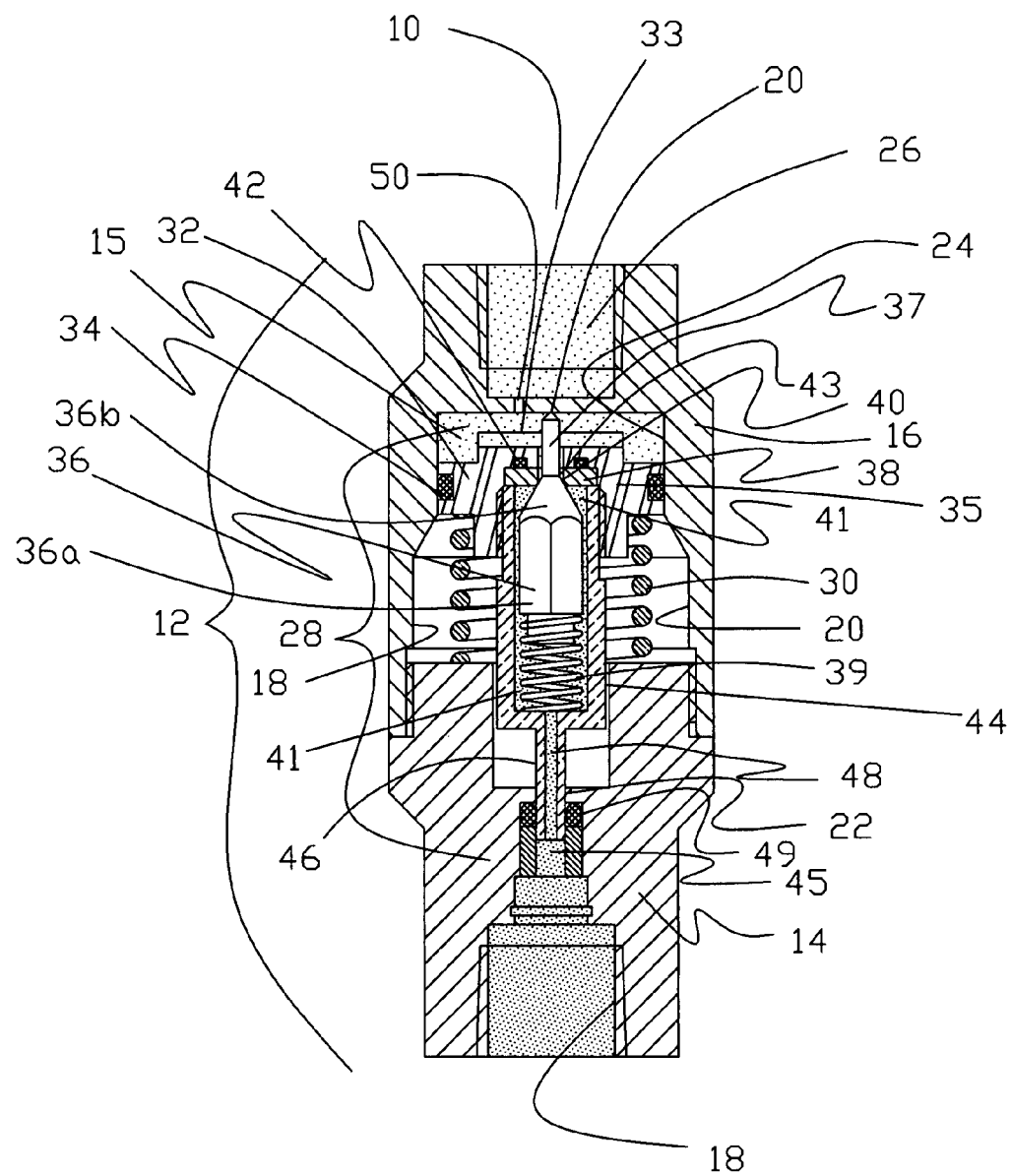
FIG. 1 is a cutaway view of one embodiment of Applicant's novel gas pressure regulator.
Figure 1A:
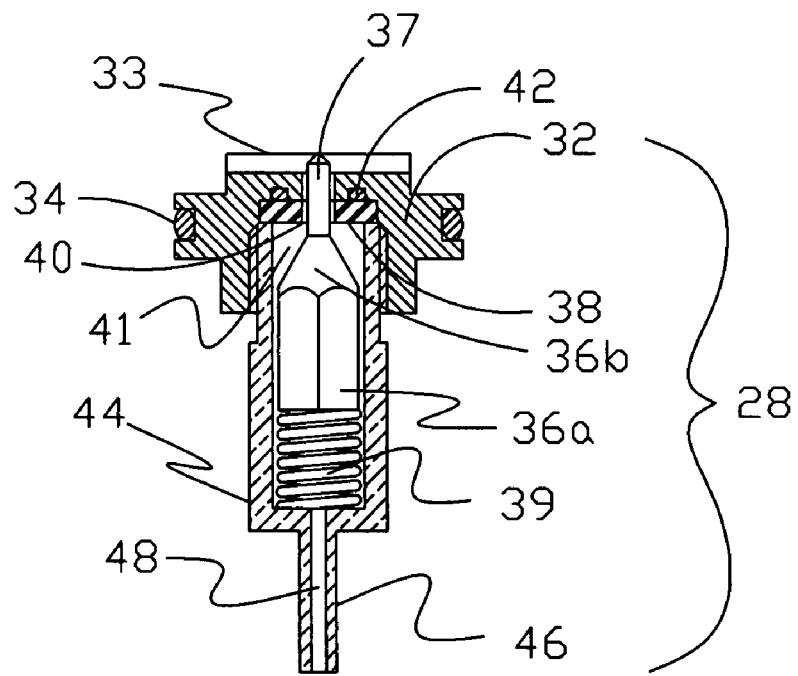
FIG. 1a is a view of the valve and piston assembly of an embodiment of the pressure regulator.
Figure 1B:
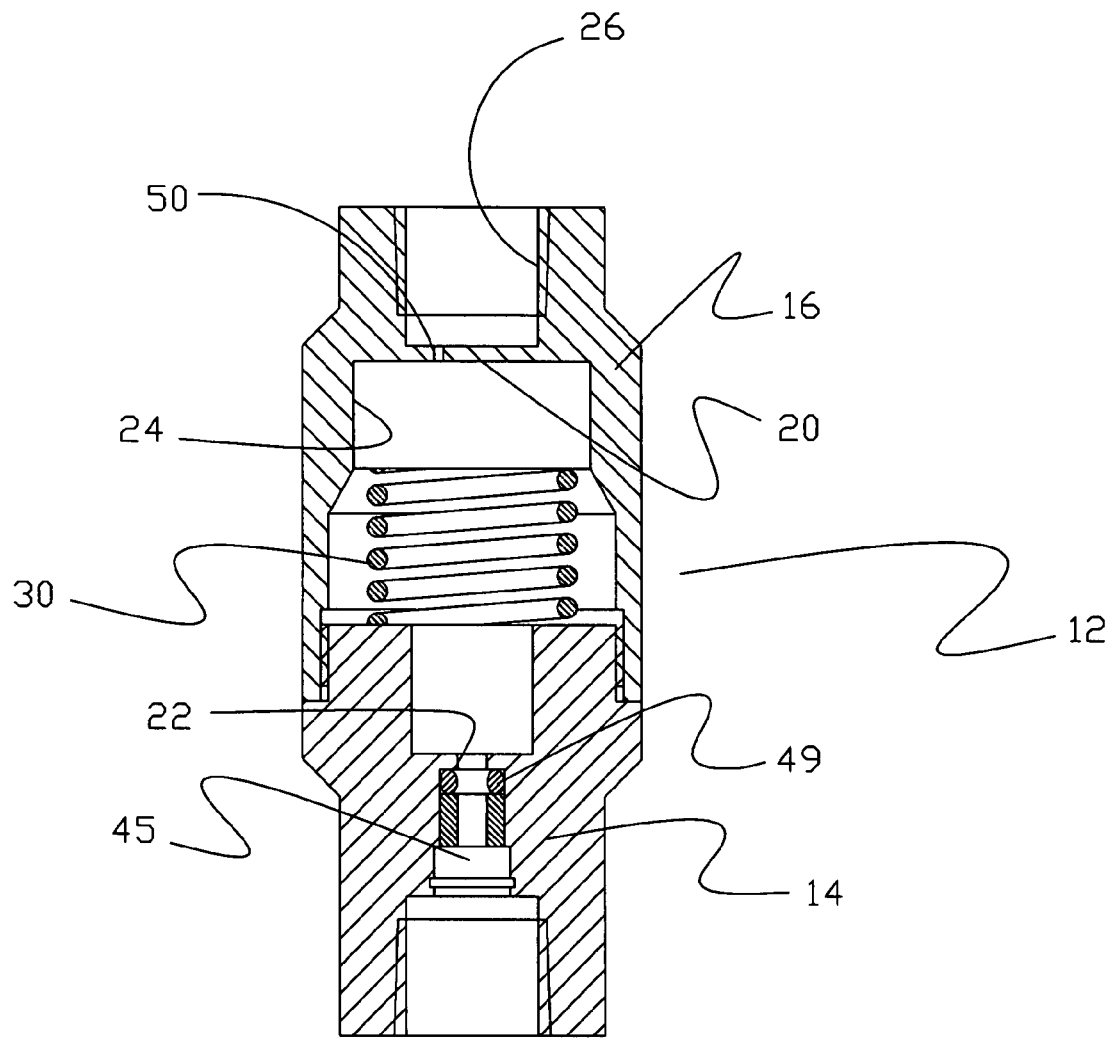
FIG. 1b is a view of the pressure regulator with the valve and piston assembly removed therefrom.

10 Gas regulator
12 Body
14 First portion of body
15 Regulated chamber
16 Second portion of body
18 Inner walls
20 Engagement walls
22 Stem guide walls
24 Piston chamber walls
26 Low pressure outlet walls of second portion 16
28 Valve and piston assembly
30 Main spring
32 Piston head
33 Crown of piston head
34 O-ring (of piston head)
35 Piston
36 Plug
37 Plug arm
38 Seal
39 Plug keeper spring
40 Piston head opening
41 Inner volume of piston
42 O-ring
43 Transition or regulator valve (equals 36, 38, 40, and 42)
44 Piston body
45 Piston stem port
46 Piston stem
48 Channel
50 Transfer port
51 System
52 Spring set
53 Receiving device
54 Coupler
55 High pressure source
56 Body (nipple portion)
57 Seat
58 Outlet pressure adjustment mechanism
60 Adjustment stem
62 Adjustment stem knob
70 Plug seal
72 Manifold
72a High pressure source opening
72b High pressure source opening
78 Membrane FIG. 1 is a cross-sectional area of gas pressure regulator 10 comprising body 12. Body 12 may include, in one embodiment of the invention, first portion 14 and second portion 16, the portions engaged, for example, by threads.

Body 12 may have inner walls 18, including stem guide walls 22 defining, in part, piston stem port 45. Inner walls 18 may also include piston chamber walls 24, and low pressure source walls 26.

A valve and piston assembly 28 is provided, which valve and piston assembly is acted upon by a main spring 30, which main spring engages inner walls 18 of body 12. A piston 35 includes a piston body 44 having a piston stem 46 and a piston head 32 having a crown 33. The piston body has a piston stem 46 for engagement with stem guide walls 22. Piston body 44 may be threadably engaged to piston head 32. O-ring 34 of piston head 32 is provided for a gas sealing engagement of piston head 32 with piston chamber walls 24. Piston head 32 includes a valved piston head opening 40. Valved piston head opening 40 may also include, in part, a seal 38, typically cylindrical such as a Delrin seal that surrounds opening 40. Seal 38 may be elastomeric and act as a seat for receiving a plug 36 as set forth in more detail below. Piston stem 46 is hollow, having a channel 48, which channel is in fluid communication with walls defining an interior volume 41 of piston 35.

Valve and piston assembly 28 also includes the plug 36, the plug having a plug arm 37, the plug arm 37 extending through valved piston head opening 40. The plug 36 may have a plug body 36a including a conical section 36b, which conical section 36b may terminate at a plug arm 37. Plug keeper spring 39 acts against inner walls of piston 35 and plug 36 so as to bias plug arm 37 towards seal 38 and against inner walls of body 12 at engagement walls 20 as seen in FIG. 1. That is, plug keeper spring 39 will assert a force against plug 36 so as to urge plug arm 37 against inner walls of body 12, while piston 35 may move longitudinally along piston chamber walls to move valved piston head opening 40 longitudinally back and forth in the piston chamber responsive to pressure at piston stem port 45 and in regulated chamber 15 to seat and unseat plug 36.

A number of O-rings are provided, including O-ring 42, between seal 38 and walls of piston head 32, O-ring 49 sealing walls of piston stem 46 against walls of body 12, namely stem guide walls 22 and O-ring 34 between the sliding piston head and body walls.

In operation, high pressure is provided at piston stem port 45, which acts through channel 48, and inner volume 41 on valved opening 40 in piston head 32. If the force asserted on the piston stem port and by spring 30 as seen in FIG. 1 (pushing the piston upward) is greater than the force pushing the piston downward, the piston will move up and, if the plug is seated against seal 38, will unseat and uncover piston head opening 40 to allow gas to enter a regulated chamber 15 defined by the piston head crown 33 and some of the inner walls of piston body 12 seen in FIG. 1. As the regulated chamber fills, pressure will be asserted on the piston crown to urge the piston in a downward direction as seen in FIG. 1 until it seats seal 38 against plug 36 closing valved opening 40. Here the forces will be substantially in balance.

To move the piston up as seen in FIG. 1, the force at piston stem 46 must overcome the force applied by gas in the regulated chamber acting against the piston crown, as well as the slight force of plug spring 39.

Looking at the forces on the seal plug, Applicant's note the balanced forces
 a. $A_s$=sealed area
 b. $B_s$=supply fluid pressure
 c. $F_s$=seal force on plug ($F_s = A_s \times B_s$)
 d. $F_s = F_p$
 e. $A_c$=area compression tube
 f. $F_c$=force on compression tube
 g. $F_c = B_s \times A_c$
 h. $F_c$ varies with input pressure, $\Delta P_s$
 i. $F_x + F_c = F_{rg} + F_p$, where $F_{rg}$ is force of regulated pressure, and $F_p$ is force of stem. $F_s$ is a constant (load spring).

Therefore, $F_s \approx F_p$, which $\approx F_c$; therefore, when there is a drop at $F_s$ ($\Delta F_s$), $F_p$ drops as does $F_c$. The valve is sensitive and responsive, due in part, to the cross-sectional area of the piston stem being about equal to valved opening 40.

Figure 2A:
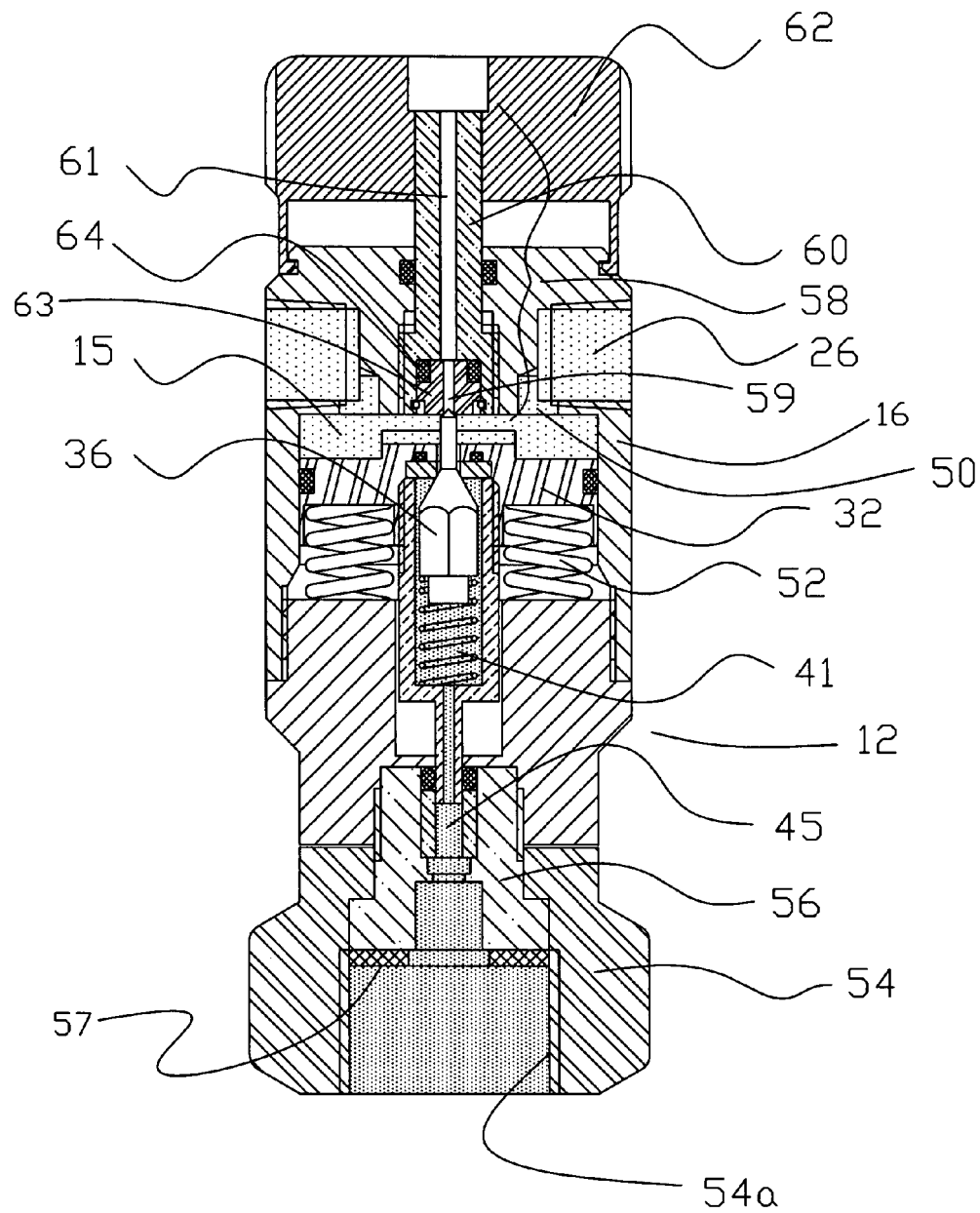
FIG. 2a is a cutaway view of another embodiment of Applicant's novel gas pressure regulator.
Figure 2B:
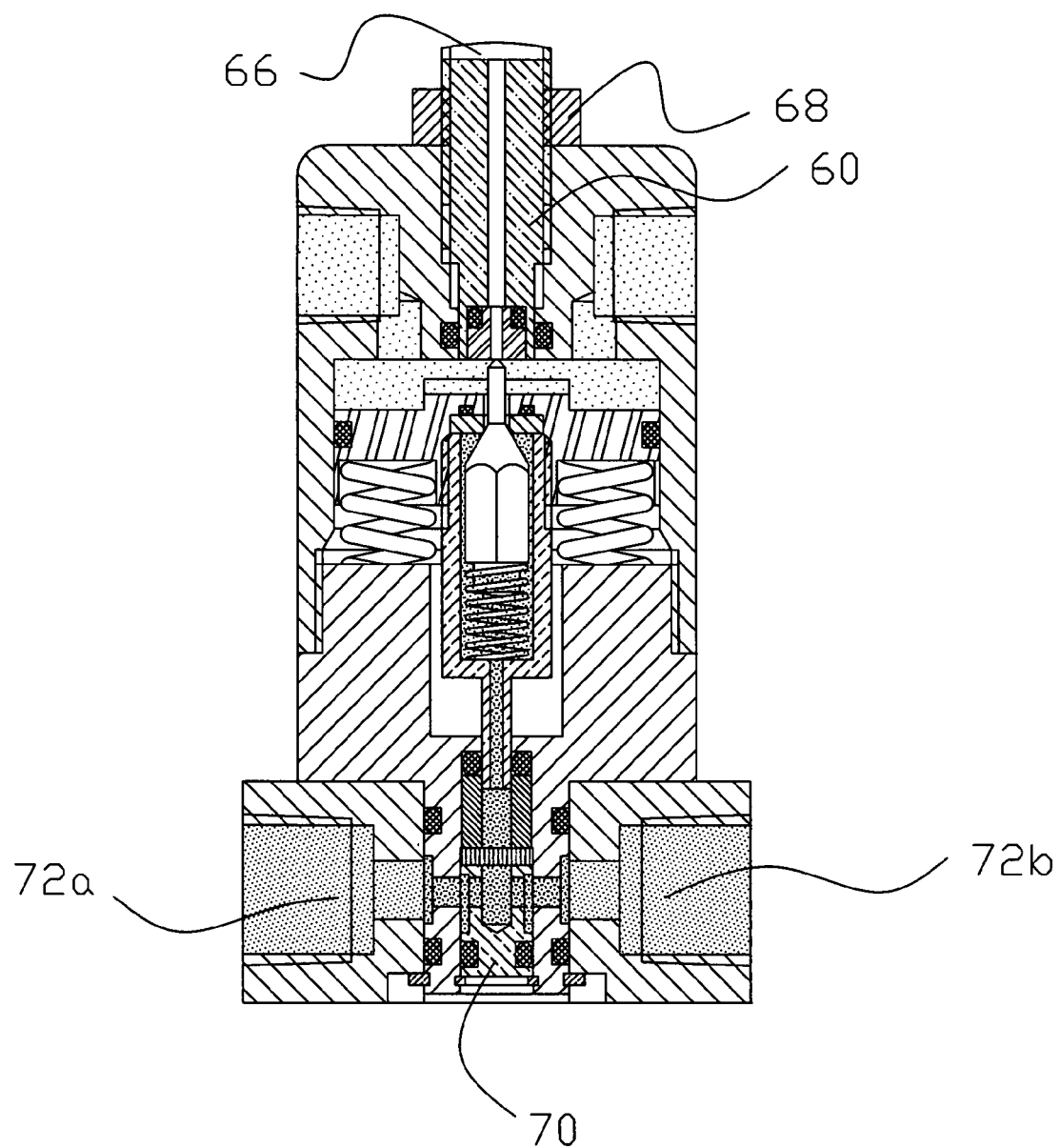
FIG. 2b is a cutaway view of another embodiment of Applicant's novel gas pressure regulator.

FIGS. 2a and 2b illustrate two variations of Applicant's novel valve and piston gas pressure regulator.

FIG. 2a illustrates that, in place of a single main spring, as shown in FIG. 1, a spring set 52 may be used. Two springs of the spring set 52 are illustrated in the view shown in FIG. 2a, but a multiplicity, here six, would be provided in the full instrument. Sets may include two or more springs. Each spring of spring set 52 is ideally materially identical and the springs of the spring set are typically arranged circumferentially around a longitudinal axis of the piston between outside walls of the piston and inner walls of the body. The use of a multiplicity of springs instead of a single spring is believed to achieve the benefits of better balance, sensitivity and accuracy, especially at low pressure; as well as the ability to provide a more compact design.

FIG. 2a also illustrates the use of a high pressure source coupling knob or coupler 54, which includes a threaded portion 54a, and which coupler 54 is engaged with valve body 12, so it may freely rotate with respect to the valve body. Further, a nipple portion 56 of valve body 12 (engaged, for example, by threads) may be dimensioned to slideably receive the valve stem and define piston stem port 45. The use of coupler 54 allows one to hold the valve body 12 in a fixed position as the coupler 54 rotatably engaged or disengaged with the threaded portion of a high pressure source, the threads for being engaged and bringing the high pressure source into gas sealing relation with seat 57. In other words, coupler 54 avoids the necessity of rotating the entire body 12 of the gas pressure regulator onto the high pressure source, such as is required in the embodiment set forth in FIG. 1.

FIG. 1 illustrates a set pressure regulator. The value of the cutoff pressure may be set by taking into account the length of the plug arm and the main spring length, as well as the main spring compression factor. For given plug arm length and main spring, movement of engagement walls towards the piston crown will increase the cutoff pressure, requiring greater spring compression before the seat meets the plug to cut off flow through the valved opening.

FIG. 2a also illustrates the use of an outlet pressure adjustment mechanism 58, which may include an over pressurization relief port 59 located in seat 63. Outlet pressure adjustment mechanism 58 includes an adjustment stem 60, adjustment stem knob 62, and adjustment stem seal 64, defining relief port 59. Stem knob 62 is in slotted engagement with adjustment stem 60. Rotating knob 62 will slide stem 60 longitudinally.

As can be seen in FIG. 2a, plug arm 37 engages relief port 59. Further, it is seen that adjustment stem knob 62 is rotationally engaged to the first portion of the valve body so as to rotate about the valve body. Moreover, a near end of adjustment stem 60 has a seat 63. A near end of adjusting stem 60 is threadably engaged with first portion 16 of valve body 12. Thus, when stem knob 62 (which is fixedly attached to adjusting stem 60) is rotated, it will cause adjusting stem 60 to rotate, which being threadably engaged to first portion 16 of valve body 12 will move the seat 63 with relief port 59 longitudinally. Such movement will change the distance between the piston head and relief port 59. As discussed above, for a given plug arm dimension, changing the distance from the engagement walls, here defining relief port 59, and the valved opening 40 will change the setting of the outlet pressure valve. Thus, FIG. 2a illustrates a manner in which the outlet pressure may be selectively set. Further, FIG. 2a illustrates the use of engagement walls 20 defining a relief port 59, which relief port allows for the relief of gas in an overpressurization system that may occur downstream of regulated chamber 15 by allowing gas to escape through relief port 59 and out relief port vent channel 61.

FIG. 2b illustrates the use of Applicant's valve and piston assembly with an adjusting stem 60 that has, instead of an adjusting knob, a screwdriver slot 66 which, when engaged to a screwdriver allows the adjustable stem 60 to be rotated as in the embodiment set forth in FIG. 2a, but includes a locknut 68 which, when the desired cutoff pressure is selected by positioning adjustable stem 60 with respect to the valve body, locknut 68 can be rotated down tight onto the valve body to prevent rotation of adjustable stem 60 and subsequent loss of proper set value.

FIG. 2b also illustrates plug seal 70 that may be used to seal high pressure source port opening as it is positioned longitudinally in the other embodiments and provide, for example, two high pressure source openings 72a and 72b laterally with respect to a longitudinal axis of the body, as seen in FIG. 2b.

Figure 2C:
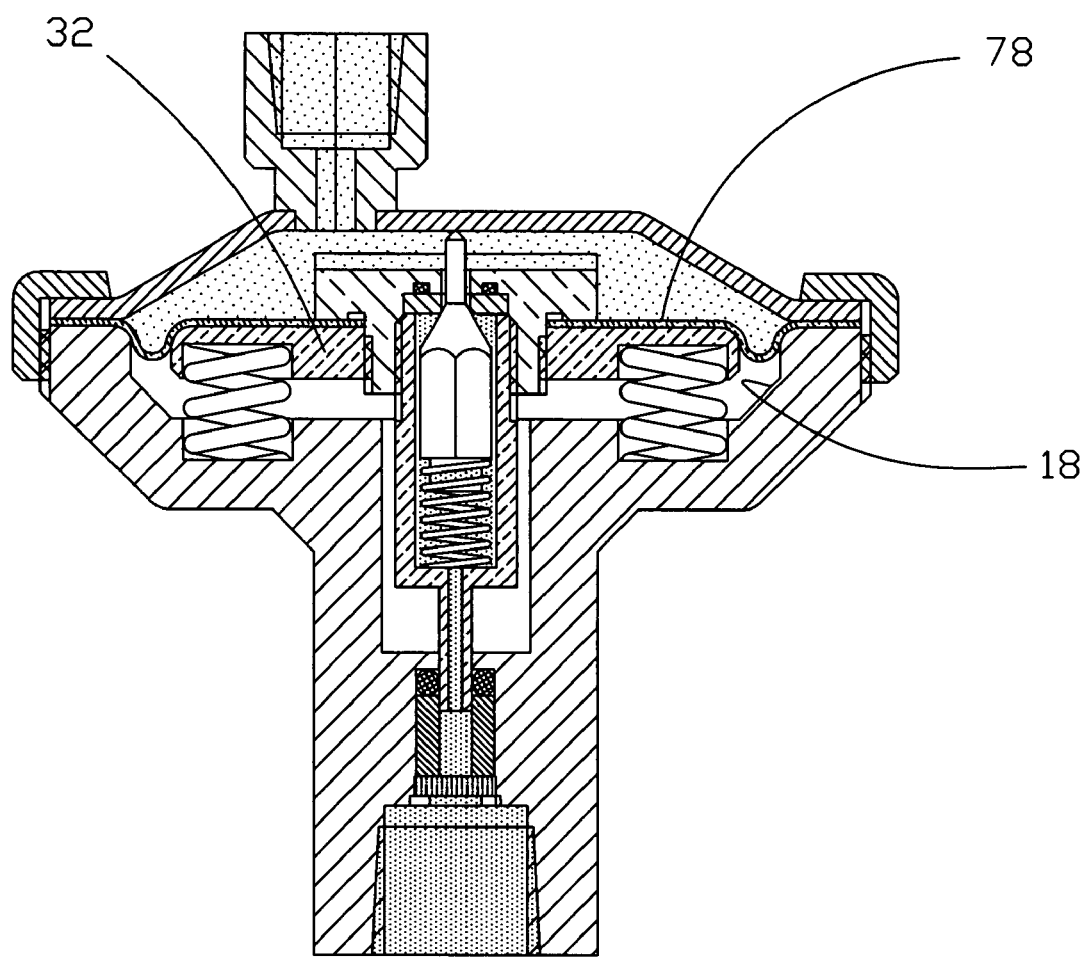
FIG. 2c is another embodiment of the pressure regulator.

FIG. 2c illustrates another preferred embodiment of Applicant's novel gas regulator 10. In this embodiment, a difference is the use of a flexible fluid sealing membrane 78, which seals a gap between piston head 32 and inner walls 18 of body 12. It is noted in the embodiment illustrated in FIG. 2c, that the frictional forces found in the earlier embodiments where the piston head and O-ring slide along the inner walls 18 are avoided—yet there is in fact an effective seal generated by fluid sealing membrane 78. Thus, it is believed that even further sensitivity may be achieved with this embodiment. Note that this embodiment may be used with one or more of the features illustrated in other embodiments. Fluid sealing membrane 78 may be made from a number of suitable materials, such as, for example, steel mesh reinforced rubber or fabric reinforced rubber or the like. Indeed a thin steel sheet may be used. Membrane 78 acts as a "bellows" in this embodiment. Thus, the embodiment illustrated in FIG. 2c may utilize a diaphragm action for cutoff.

The O-ring between the piston head 32 and inner walls 18 of the body 12 or the flexible membrane 78 or other means known in the art may define a fluid sealing means between the piston head and the inner walls of the body. A sealing means (hydraulic or pneumatic) will function to seal off a regulated chamber which is in fluid communication with the high pressure source through the valved opening and also a low pressure device downstream.

The use of any of the embodiments disclosed herein provide for low pressure accuracy, sensitivity and repeatability, for example, down to 5 to 7 lbs. on a ⅛ inch diameter piston, that in the prior art would typically require a larger piston diameter. The use of a flexible sealing member provides the ability to get greater area on the piston face, removes friction of the O-rings, and may provide better performance and increased accuracy at low pressure.

Figure 3:
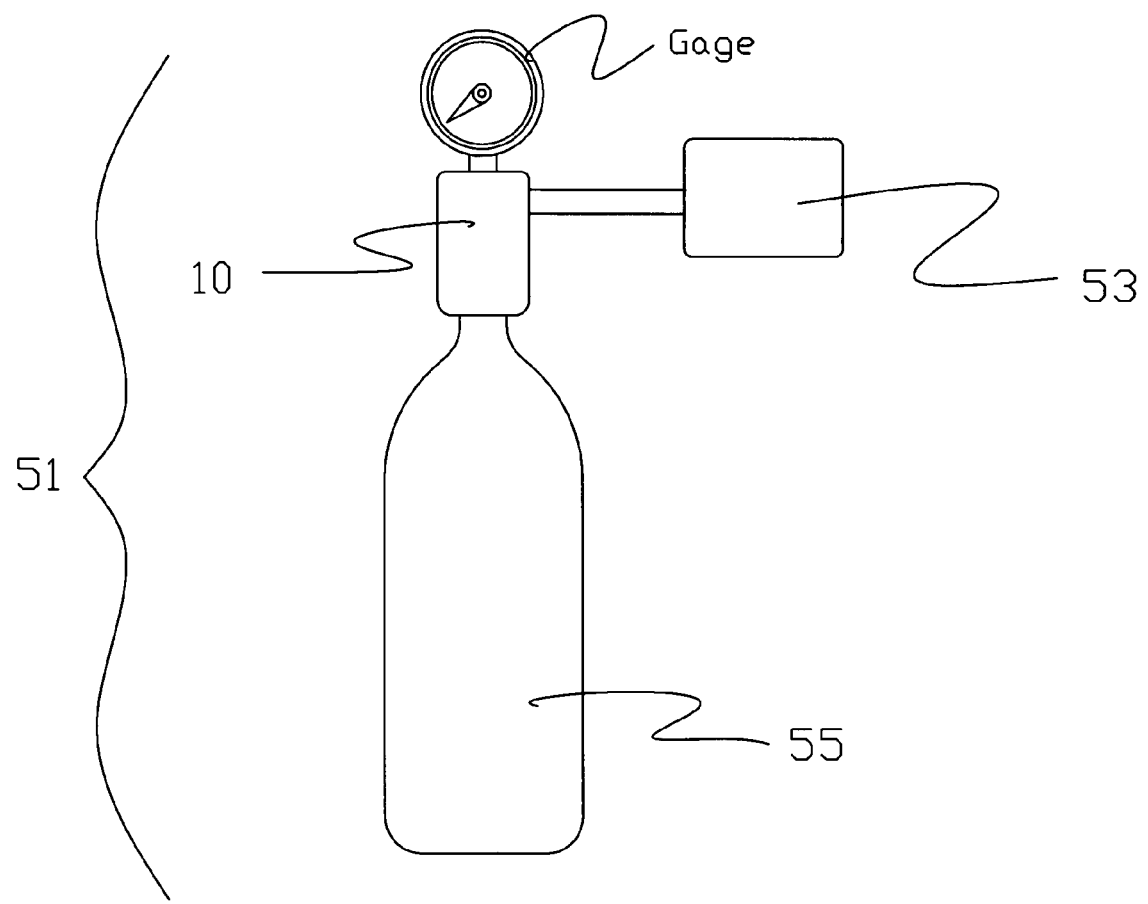
FIG. 3 is an equipment drawing of a system showing a high pressure gas source and a low pressure gas receiving device, using Applicant's novel gas pressure regulator.

FIG. 3 illustrates a system 51, which system 51 provides for a regulated transfer of gas from a high pressure source 55 to a regulated gas receiving device 53 through Applicant's novel gas pressure regulator 10 which has a valve in piston structure to compensate for a drop in pressure at high pressure source 55 as receiving device 53 uses the high pressure source gas, which structure allows the receiving device to continue to receive gas from the high pressure source at the preset pressure value. The high pressure sources may include: oxygen, a breathable gas, an inert gas, $CO_2$, $N_2$, argon, nitrous oxide or any other gas or fluid Receiving devices may include: a wine bottle, tool or any other device. The receiving device may also include a helmet for use by an astronaut, race car driver or underwater diver wherein the high pressure source is a tank containing a breathable gas.

Figure 4A:
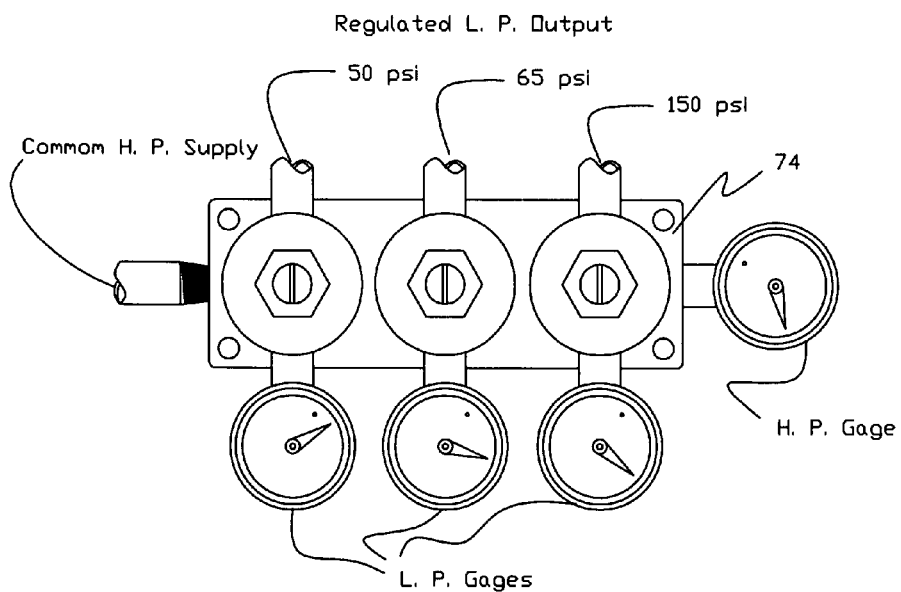
FIGS. 4a and 4b are top and side elevational views respectively of a system using a high pressure source in a multiplicity of Applicant's novel gas pressure regulators.
Figure 4B:
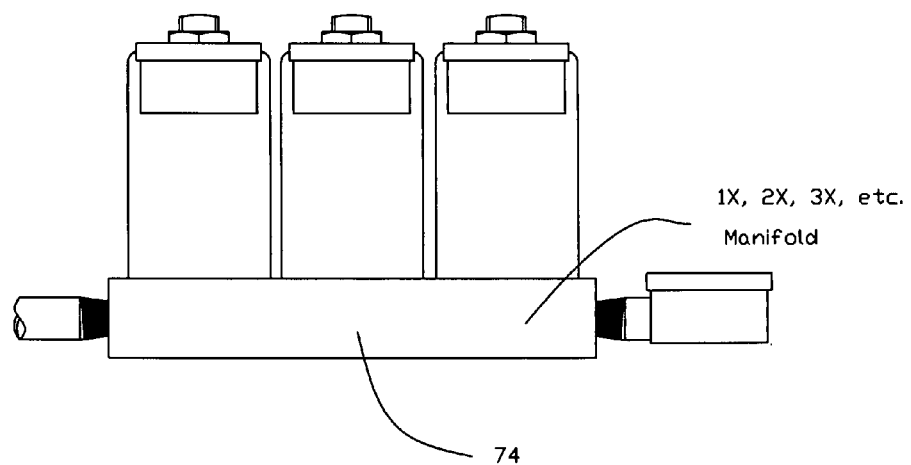

FIGS. 4a and 4b illustrate two views of the system in which a multiplicity of Applicant's novel regulator 10 (see FIG. 2b) are used with a manifold 74 and a high pressure supply. In this manner, one or more single high pressure supplies can provide low pressure gas to two or more low pressure receiving devices with the use of manifold 74, which manifold would have inner channels that will supply fluid from the high pressure supply line, which is engaged to the walls of the manifold to the low pressure users through Applicant's novel gas regulators 10. In the system illustrated, the first gas pressure regulator is set at a first cutoff pressure, here 50 lbs., at a second pressure, here 65 lbs., and the third at a third pressure, here 150 lbs.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims. For example, gas is considered to be a fluid, the device may operate with either a liquid or a gas.

The invention claimed is:

1. A regulator comprising:
    a body having a longitudinal axis and inner walls, the inner walls defining at least engagement walls, piston chamber walls, piston stem guide walls, and a piston stem port;
    spring means biasing a piston towards engagement walls;
    a valve and piston assembly, including a piston having a body and piston head, the piston body having a piston stem, the piston stem having a channel therein, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
    sealing means between the piston head and the inner walls of the body;
        wherein the crown of the piston head and a portion of the inner walls of the body define a regulated chamber;
        wherein the piston stem is in sliding engagement with the piston stem guide walls, wherein the area of the valved opening is approximately equal to the area of the piston stem port.

2. The regulator of claim 1, wherein the valved opening of the piston head includes a seat, the seat comprising an elastomeric member.

3. The regulator of claim 1, wherein the piston head is threadably engaged with the piston body.

4. The regulator of claim 1, wherein the body includes at least a first portion and a second portion.

5. The regulator of claim 4, wherein the first portion and the second portion are threadably engaged.

6. The regulator of claim 1, further including means to adjustably set an output pressure value.

7. The regulator of claim 1, further including means to maintain a set output pressure value while a high pressure source value drops.

8. The regulator of claim 1, wherein spring means is either a single spring or a spring set.

9. The regulator of claim 1, wherein the body includes structure to move engagement walls towards or away from the valved opening of the piston head.

10. The regulator of claim 1, wherein the body includes a relief port for venting the regulated chamber in an overpressurization condition.

11. The regulator of claim 1:
wherein the body includes structure to move engagement walls towards or away from the valved opening of the piston head; and
wherein the body includes a relief port for venting the regulated chamber in an overpressurization condition.

12. The regulator of claim 11, further includes an adjustment knob, engageable with the structure, to rotate the structure.

13. The regulator of claim 1, wherein the sealing means is an "O" ring.

14. The regulator of claim 1, wherein the sealing means is a flexible sealing member fixed by engagement to the piston and with the inner walls.

15. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly including a piston having a body and piston head, the piston body having a piston stem having a channel therein, the channel in fluid communication with the piston stem port, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
sealing means between the piston head and the inner walls of the body;
wherein the crown of the piston head and a portion of the inner walls of the body define a regulated chamber;
wherein the piston is biased towards engagement walls by spring means;
wherein the piston stem is in sliding engagement with the piston stem guide walls; and further including means to adjustably set an output pressure value; and
wherein the body includes structure to move engagement walls towards or away from the valved opening of the piston head.

16. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly, including a piston having a body and piston head the piston body having a piston stem, the piston stem having a channel therein, the channel in fluid communication with the piston stem port, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
sealing means between the piston head and the inner walls of the body;
wherein the crown of the piston head and a portion of the inner walls of the body define a regulated chamber;
wherein the piston is biased towards engagement walls by spring means;
wherein the piston stem is in sliding engagement with the piston stem guide walls; and further including means to adjustably set an output pressure value; and
wherein the body includes a relief port for venting the regulated chamber in an overpressurization condition.

17. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly, including a piston having a body and piston head, the piston body having a piston stem, the piston stem having a channel therein, the channel in fluid communication with the piston stem port, the piston head having a crown and having a valved opening and outer walls, the piston body also having an inner volume in fluid communication with the channel and the valved opening the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring, for acting between the piston body and the plug to urge the plug towards the valved opening; and;
sealing means between the piston head and the inner walls of the body;
wherein the crown of the piston head and a portion of the inner walls of the body define a regulated chamber;
wherein the piston is biased towards engagement walls by spring means;
wherein the piston stem is in sliding engagement with the piston stem guide walls; and further including means to adjustably set an output pressure value; and
wherein the body includes structure to move engagement walls towards or away from the valved opening of the piston head; and
wherein the body includes a relief port for venting the regulated chamber in an overpressurization condition.

18. The regulator of claim 17, further includes an adjustment knob, engageable with the structure, to rotate the structure.

19. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly, including a piston having a body and piston head, the piston body having a piston stem, the piston stem having a channel therein, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
sealing means between the piston head and the inner walls of the body;
  wherein the crown of the piston head and a portion of the inner walls of the body define a regulated chamber;
  wherein the piston stem is in sliding engagement with the piston stem guide walls, and
  further including means to maintain a set output pressure value while a high pressure source value drops.

20. The regulator of claim 19, wherein spring means is either a single spring or a spring set.

21. The regulator of claim 19, wherein the body includes a relief port for venting the regulated chamber in an overpressurization condition.

22. The regulator of claim 19, wherein the body includes at least a first portion and a second portion.

23. The regulator of claim 22, wherein the first portion and the second portion are threadably engaged.

24. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly, including a piston having a body and piston head, the piston body having a piston stem, the piston stem having a channel therein, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
sealing means between the piston head and the inner walls of the body;
  wherein the crown of the piston head and a portion of the inner walls of the body define a regulated chamber;
  wherein the piston stem is in sliding engagement with the piston stem guide walls, and
  wherein the body includes structure to move engagement walls towards or away from the valved opening of the piston head.

25. The regulator of claim 24, wherein the body includes at least a first portion and a second portion; and wherein the first portion and the second portion are threadably engaged.

26. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly, including a piston having a body and piston head, the piston body having a piston stem, the piston stem having a channel therein, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
sealing means between the piston head and the inner walls of the body;
  wherein the crown of the piston head and a portion of the inner walls of the body define a regulated chamber;
  wherein the piston stem is in sliding engagement with the piston stem guide walls, and
  wherein the body includes a relief port for venting the regulated chamber in an overpressurization condition.

27. The regulator of claim 26, wherein the body includes at least a first portion and a second portion; and wherein the first portion and the second portion are threadably engaged.

28. A regulator comprising:
a body having a longitudinal axis and inner walls, the inner walls defining at least engagement walls, piston chamber walls, piston stem guide walls, and a piston stem port;
spring means biasing a piston towards engagement walls;
a valve and piston assembly, including a piston having a body and piston head, the piston body having a piston stem, the piston stem having a channel therein, the piston head having a crown and having a valved opening and outer walls, the piston body also having an inner volume in fluid communication with the channel and the valved opening, the piston and valve assembly further including a plug, the plug having a plug body dimensioned for receipt substantially within the inner volume of the piston body and a plug arm, the plug arm extending through the valved opening for engagement with the engagement walls of the body, the valve and piston assembly further including a keeper spring for acting between the piston body and the plug to urge the plug towards the valved opening; and;
sealing means between the piston head and the inner walls of the body;
  wherein the crown of the piston head and a portion of the inner walls of the body define a regulated chamber;
  wherein the piston stem is in sliding engagement with the piston stem guide walls, wherein the body includes structure to move engagement walls towards or away from the valved opening of the piston head; and wherein the body includes a relief port for venting the regulated chamber in an overpressurization condition.

29. The regulator of claim 28, wherein the body includes at least a first portion and a second portion; and wherein the first portion and the second portion are threadably engaged.

30. The regulator of claim 25, further including an adjustment knob, engageable with the structure, to rotate the structure.

31. The regulator of claim 30, wherein the body includes at least a first portion and a second portion; and wherein the first portion and the second portion are threadably engaged.

* * * * *